United States Patent
Williams et al.

(10) Patent No.: US 10,875,392 B2
(45) Date of Patent: Dec. 29, 2020

(54) TONNEAU COVER WITH INTEGRATED DRYING CAVITY

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/395,805

(22) Filed: Apr. 26, 2019

(65) Prior Publication Data
US 2020/0340744 A1    Oct. 29, 2020

(51) Int. Cl.
*B60J 7/16*        (2006.01)
*F26B 19/00*       (2006.01)

(52) U.S. Cl.
CPC .......... *B60J 7/1607* (2013.01); *F26B 19/005* (2013.01)

(58) Field of Classification Search
CPC .............................. B60J 7/1607; F16B 19/005
USPC .............................. 296/208, 100.02, 136.03
See application file for complete search history.

(56) References Cited

U.S. PATENT DOCUMENTS

| | | | |
|---|---|---|---|
| 5,398,985 A * | 3/1995 | Robinson | B60J 7/223 296/10 |
| 8,210,591 B2 * | 7/2012 | Martin | B60R 9/00 296/100.07 |
| 9,393,855 B2 | 7/2016 | Rohr et al. | |
| 9,487,248 B1 | 11/2016 | Buckhalt et al. | |
| 9,682,733 B2 | 6/2017 | Krishnan et al. | |
| 9,713,950 B1 * | 7/2017 | Stoddard, Jr. | B60J 7/1621 |
| 9,925,853 B2 | 3/2018 | Aubrey et al. | |
| 2002/0089202 A1 | 7/2002 | Henderson | |
| 2016/0039275 A1 * | 2/2016 | Rohr | B62D 33/02 296/100.06 |
| 2016/0167592 A1 * | 6/2016 | Williams | B60R 13/08 296/37.6 |

* cited by examiner

*Primary Examiner* — Jason S Morrow
(74) *Attorney, Agent, or Firm* — Christopher G Darrow; Darrow Mustafa PC (57) ABSTRACT

A tonneau cover for a vehicle cargo includes a first panel having a first opening structured to enable fluid communication between a first side of the first panel and a second side of the first panel opposite the first side. The tonneau cover defines at least one airflow passage in fluid communication with the first opening and extending along the second side of the first panel.

16 Claims, 7 Drawing Sheets

TONNEAU COVER WITH INTEGRATED DRYING CAVITY

The subject matter described herein relates in general to vehicle tonneau covers and, more particularly, to a tonneau cover having a storage cavity formed usable for drying wet articles during motion of a vehicle.

BACKGROUND

Items of clothing and other items (such as towels, sports equipment, camping gear, etc.) may become wet due to rain or participation of a user in recreational activities. The user may not wish to bring wet items into a vehicle passenger compartment, due to the potential for damage to the vehicle seats and other portions of the interior.

SUMMARY OF THE INVENTION

In one aspect of the embodiments described herein, a tonneau cover for a vehicle cargo is provided. The tonneau cover includes a first panel having a first opening structured to enable fluid communication between a first side of the first panel and a second side of the first panel opposite the first side. The tonneau cover defines at least one airflow passage in fluid communication with the first opening and extending along the second side of the first panel.

In another aspect of the embodiments described herein, a tonneau cover is provided for a vehicle having a cab and a cargo bed located behind the cab. The tonneau cover includes an airflow inlet located so as to be positioned along a first side of a top panel of the tonneau cover between the cab and a rear end of the tonneau cover when the tonneau cover is mounted on the vehicle so as to cover the cargo bed. An airflow outlet is located so as to be positioned along the first side of the top panel between the cab and the airflow inlet when the tonneau cover is mounted on the vehicle so as to cover the cargo bed. An airflow passage extends along a second side of the cover top panel opposite the first side.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

In one or more arrangements described herein, a tonneau cover is provided for a vehicle having a cab and a cargo bed located behind the cab. The tonneau cover includes an airflow inlet located so as to be positioned along a first side of a top panel of the tonneau cover between the cab and a rear end of the tonneau cover when the tonneau cover is mounted on the vehicle so as to cover the cargo bed. An airflow outlet is located so as to be positioned along the first side of the top panel between the cab and the airflow inlet when the tonneau cover is mounted on the vehicle so as to cover the cargo bed. A second or bottom panel of the tonneau cover extends along a second side of the top panel. An airflow passage is formed between the top panel and the bottom panel. When the vehicle is moving, air flows over the cab and down onto the tonneau cover, entering the airflow passage through the airflow inlet. The airflow outlet discharges air from the airflow passage to a relatively low pressure area behind the cab. The air flowing through the airflow passage may be used to dry items positioned inside the airflow passage.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

Figure 1:
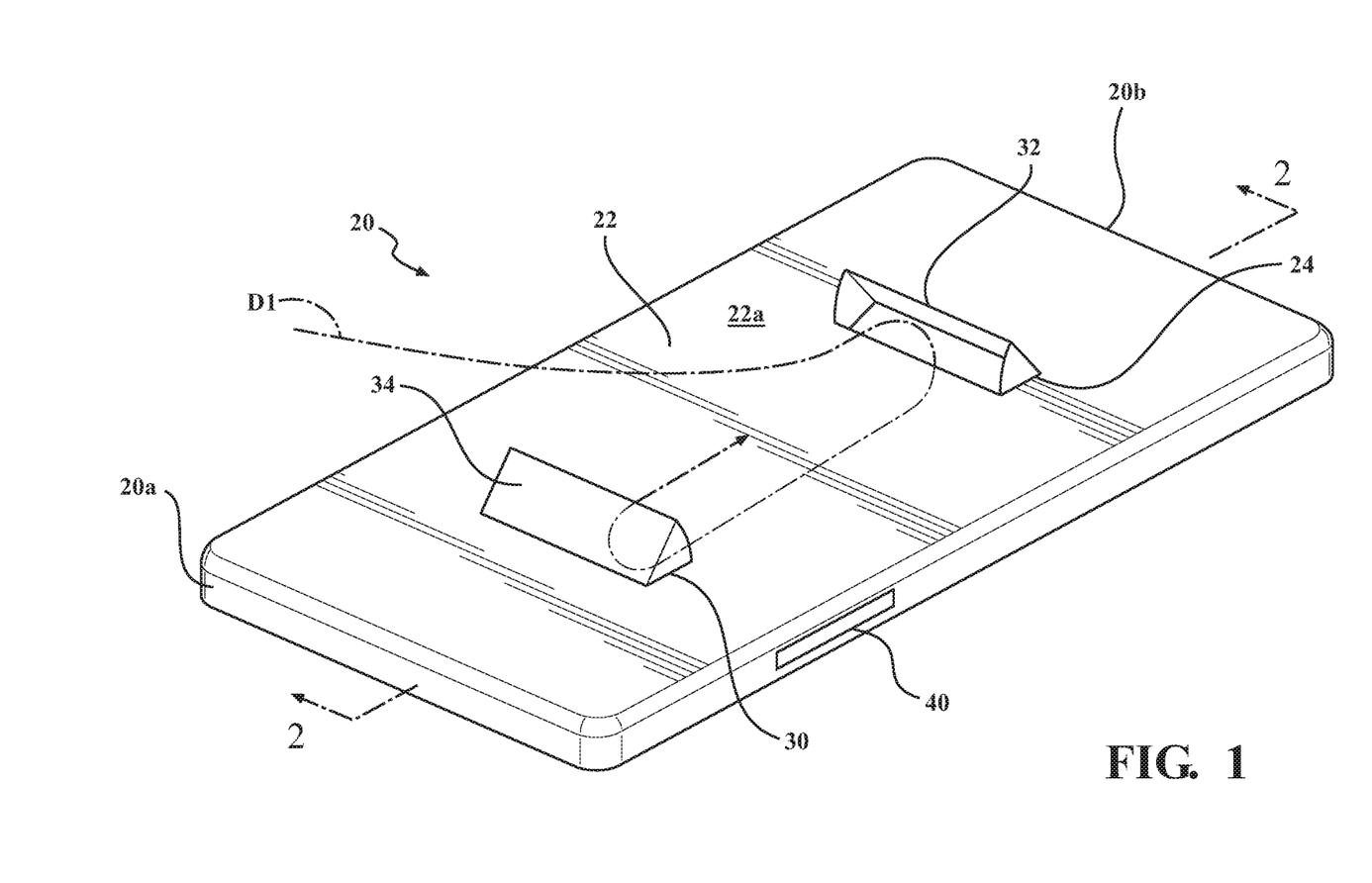
FIG. 1 is a schematic perspective view of a tonneau cover in accordance with an embodiment described herein.

FIG. 1 is a schematic perspective view of a tonneau cover 20 in accordance with an embodiment described herein. The tonneau cover 20 may be configured for covering a cargo bed of a pickup truck, for example. The tonneau cover 20 may have a first end 20a and a second end 20b opposite the first end. In one or more arrangements, the first end 20a may be configured to be a front or forward end of the tonneau cover when the cover is mounted on a vehicle, and the second end 20b may be configured to be a rear or backward end of the tonneau cover when the cover is mounted on the vehicle.

Figure 2:
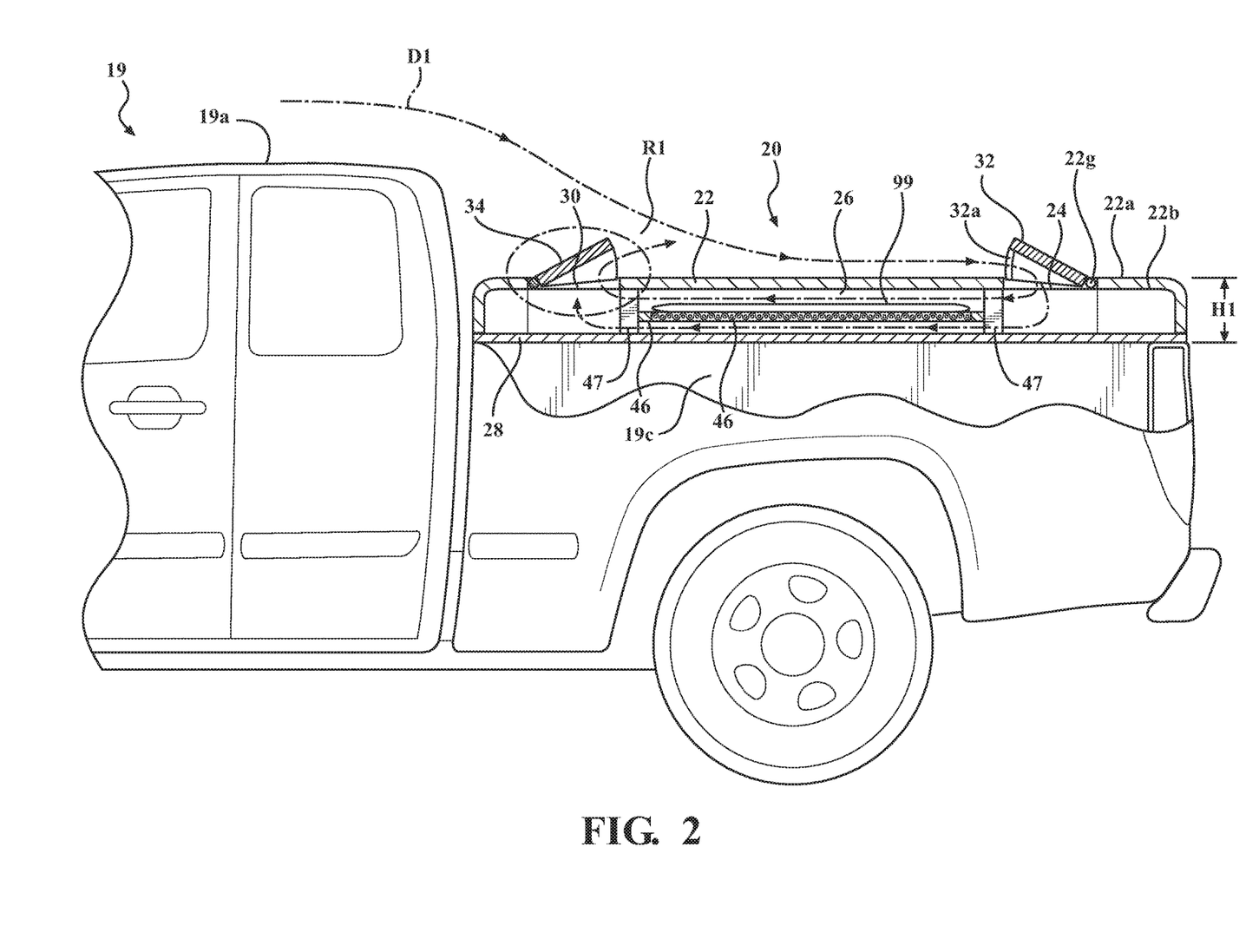
FIG. 2 is a schematic cross-sectional side view of the tonneau cover shown in FIG. 1.

FIG. 2 is a schematic cross-sectional side view of the tonneau cover 20 shown in FIG. 1. Referring to FIGS. 1 and 2, in one or more arrangements, the tonneau cover 20 may include a first panel 22. The first panel 22 may be configured to be a top panel of the tonneau cover 20 when the cover 20 is secured to a vehicle 19 so as to cover the vehicle cargo bed. A first panel 22 as described herein may be fabricated from multiple, separately formed pieces or sub-panels, or the first panel may be formed as a single piece. The first panel 22 may be formed from any suitable material or materials (for example, polymers, metals, etc.) using any suitable methods, such as molding, forming, etc.

The first panel 22 may include a first opening 24 structured to enable fluid communication between a first side 22a of the first panel and a second side 22b of the first panel 22 residing opposite the first side 22a. The first side 22a of the first panel 22 may be configured to provide an uppermost surface of the tonneau cover when the cover is mounted on the vehicle 19 so as to cover a vehicle cargo bed 19c.

In one or more arrangements, the first opening 24 may be structured to serve as an inlet to a tonneau cover airflow passage 26 (described below). For this purpose, the first opening 24 may be positioned at a location on the first panel 22 configured to reside near the second or rear end 20b of the tonneau cover when the cover is mounted on the vehicle 19. This positioning may enable the channeling of air flowing over and around the vehicle into the first opening 24 as described herein. Possible locations of the first opening 24a along the tonneau cover 20 suitable for fluid communication with an airflow streaming over the top of the tonneau cover may be determined by analysis and/or experimentation using known methods (for example, wind tunnel testing). Although the embodiments in the drawings show a single first opening 24, multiple first openings may be provided for receiving and conveying air into the airflow passage 26.

In FIG. 2, the tonneau cover is shown mounted on a vehicle 19 in the form of a pickup truck so as to cover a cargo bed 19c of the truck. Referring to the drawings, and in particular to FIGS. 1 and 2, the tonneau cover 20 may define at least one airflow passage extending therethrough. The embodiment shown in the drawings includes a single large airflow passage (generally designated 26) which may be partitionable into one or more smaller airflow passages, in a manner described herein. Airflow passage 26 may be in fluid communication with the first opening 24 and may extend along the second side 22b of the first panel 22.

In one or more arrangements, the tonneau cover 20 also includes a second panel 28 positioned opposite the first panel 22 and secured to the first panel using any suitable method(s), such as mechanical fasteners, for example. The second panel 28 may be configured to be a bottom panel of the tonneau cover 20 when the cover 20 is secured to the vehicle 19 so as to cover the vehicle cargo bed 19c. The bottom panel 28 of the tonneau cover 20 may reside directly above the cargo bed 19c when the tonneau cover 20 is mounted on the vehicle 19.

Figure 3:
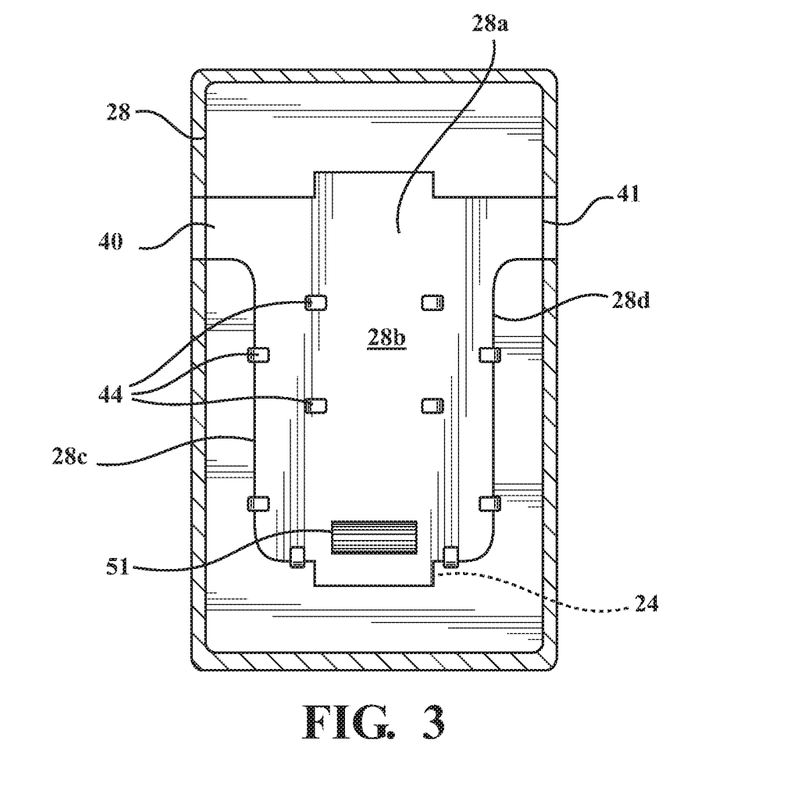
FIG. 3 is a schematic plan view of one embodiment of one embodiment of the bottom panel with the top panel removed from the tonneau cover.

FIG. 3 is a schematic plan view of one embodiment of one embodiment of the bottom panel 28, with the top panel 22 removed from the tonneau cover. Referring to FIG. 3, the airflow passage 26 may be defined by portions of the first panel 22 and/or the second panel 28. For example, the second panel 28 may include a cavity 28a formed therein. Cavity 28a may define a floor or bottom 28b and side walls 28c, 28d of the airflow passage 26. The first panel 22 may be secured atop the second panel 28 so as to cover the cavity 28a to form a top wall of the airflow passage 26. The first and second panels 22, 28 may be configured to provide a substantially gas tight seal therebetween along seams or contact surfaces thereof, so as to seal the airflow passage.

The second panel 28 may be structured to prevent leakage of moisture from the airflow passage 26 through the second panel to the cargo bed. For example, the second panel bottom 28b may be structured to provide a continuous solid surface that will receive and trap liquid, moisture, dirt, etc., from items positioned in the airflow passage. This may prevent the vehicle cargo bed 19c and/or items therein from becoming wet or soiled. The tonneau cover 20 may be configured to enable moisture collected on the second panel 28 to be dried by a flow of air moving through the airflow passage 26. Second panel 28 as described herein may be fabricated from multiple, separately formed pieces of sub-panels, or the first panel may be formed as a single piece. The second panel 28 may be formed from any suitable material or materials (for example, polymers, metals, etc.) using any suitable methods, such as molding, forming, etc.

Referring to FIGS. 1 and 2, first panel 22 may also include a second opening 30 structured to enable fluid communication between the first side 22a of the first panel 22 and the second side 22b of the first panel 22. In embodiments described herein, the airflow passage 26 may extend between the first opening 24 and the second opening 30.

In one or more arrangements, the second opening 30 may be structured to serve as an outlet for the tonneau cover airflow passage 26 described herein. For this purpose, the second opening 30 may be positioned at a location on the first panel 22 configured to reside between the first opening 24 and the cab 19a of the vehicle 19, when the tonneau cover 20 is mounted on the vehicle. In particular embodiments, the second opening 30 may be positioned at a location on the first panel 22 configured to reside relatively close to the cab 19a, or within a predetermined distance from a rearmost portion of the cab when the cover 20 is mounted on the vehicle. This positioning may enable the second opening 30 to exhaust or vent air flowing through the airflow passage 26 to a relatively low pressure region located behind the vehicle cab 19a as a result of the flow regime around the vehicle and over the tonneau cover 20, thereby facilitating air flow from the airflow passage 26.

Figure 2A:
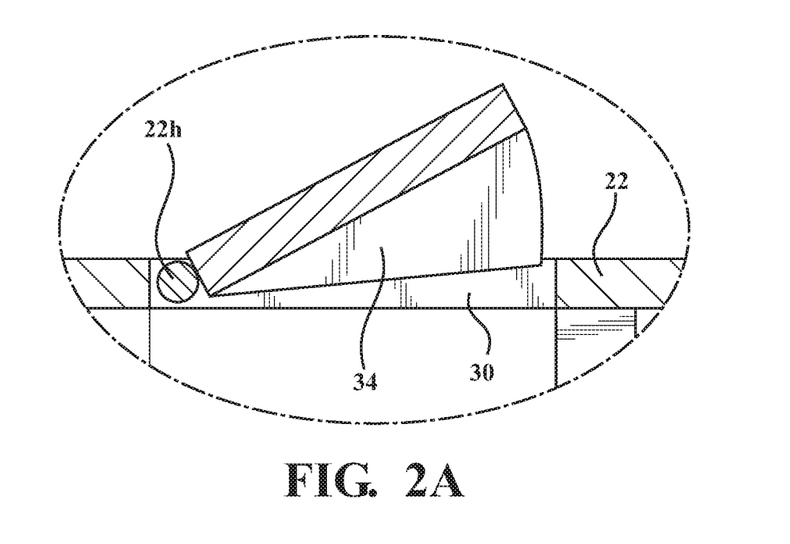
FIG. 2A is a schematic cross-sectional view of a portion of the tonneau cover shown in FIGS. 1 and 2, showing a rotatable door for opening and closing an airflow passage in the tonneau cover.

Referring to FIGS. 2 and 2A, a first door 32 and a second door 34 may be mounted to the first panel 22. The first door 32 may be operable to permit a flow of air through the first opening 24 between the first side 22a of the first panel 22 and the airflow passage 26. The first door 32 may also be operable to block a flow of air through the first opening 24 between the first side 22a of first panel 22 and the airflow passage 26. A filter 32a may be positioned over an entrance to first door 32 to aid in preventing dust and particulates from entering the airflow passage 26.

In one or more arrangements, the first door 32 may be rotatably attached to the first panel 22 using a hinge 22g or similar means. A suitable locking or securement mechanism (not shown) may be provided for securing the first door 32 in an open position as shown in FIGS. 1 and 2, to permit air to flow into the airflow passage 26 through first opening 24. As well as maintaining the first door 32 in a fully open position, the locking mechanism may also be configured to maintain the first door in any of a range of partially "open" positions, each of which provides an entrance to the airflow passage 26 having a smaller cross-sectional area than provided by the fully-open position. This enables a degree of control over the flowrate of air into the airflow passage 26.

Similarly, the locking or securement mechanism may secure the first door 32 in a closed position, to prevent air from flowing into the airflow passage 26 through first opening 24, and to provide a smooth outer surface of the tonneau cover 20 for air to flow over when the airflow passage 26 is not in use. In the closed position, the first door 32 may also prevent rain and snow from entering the airflow passage 26. A weather-tight seal may be provided between the first door 32 and the first opening 24. In one or more arrangements, the first door 32 may be configured to "scoop" or channel moving air flowing over the tonneau cover into the first opening 24 when the door is in an open condition.

In one example of a locking mechanism, a hinge or shaft connecting the door to the remainder of the tonneau cover may be coupled to a spiral wound spring or another type of spring. The spiral spring may be structured to bias the door toward the closed condition. A ratchet may be attached to the shaft, and a spring-loaded pawl may be rotatably mounted to the remainder of the tonneau cover adjacent the door. The ratchet and pawl may be engageable to hold the door in any one of several partially open configurations as a user rotates the door and ratchet against the biasing force of the spring. The user may manually disengage the pawl in a known manner to allow the spring to close the door.

The second door 34 may be operable to permit a flow of air through the second opening 30 between the first side 22a of the first panel 22 and the airflow passage 26. The second door 34 may also be operable to block a flow of air through the second opening between the first side of the first panel 22 and the airflow passage 26. In one or more arrangements, the second door 34 may be rotatably attached to the first panel using a hinge 22h or similar means. A suitable locking or securement mechanism (not shown) may be provided for securing the second door 34 in an open position as shown in FIGS. 1, 2, and 2A to permit air to flow out of the airflow passage 26 through second opening 30. The locking or securement mechanism may also secure the second door 34 in a closed position, to prevent rain and snow from entering the airflow passage 26. A weather-tight seal may be provided between the second door 34 and the second opening 30.

Figure 2B:
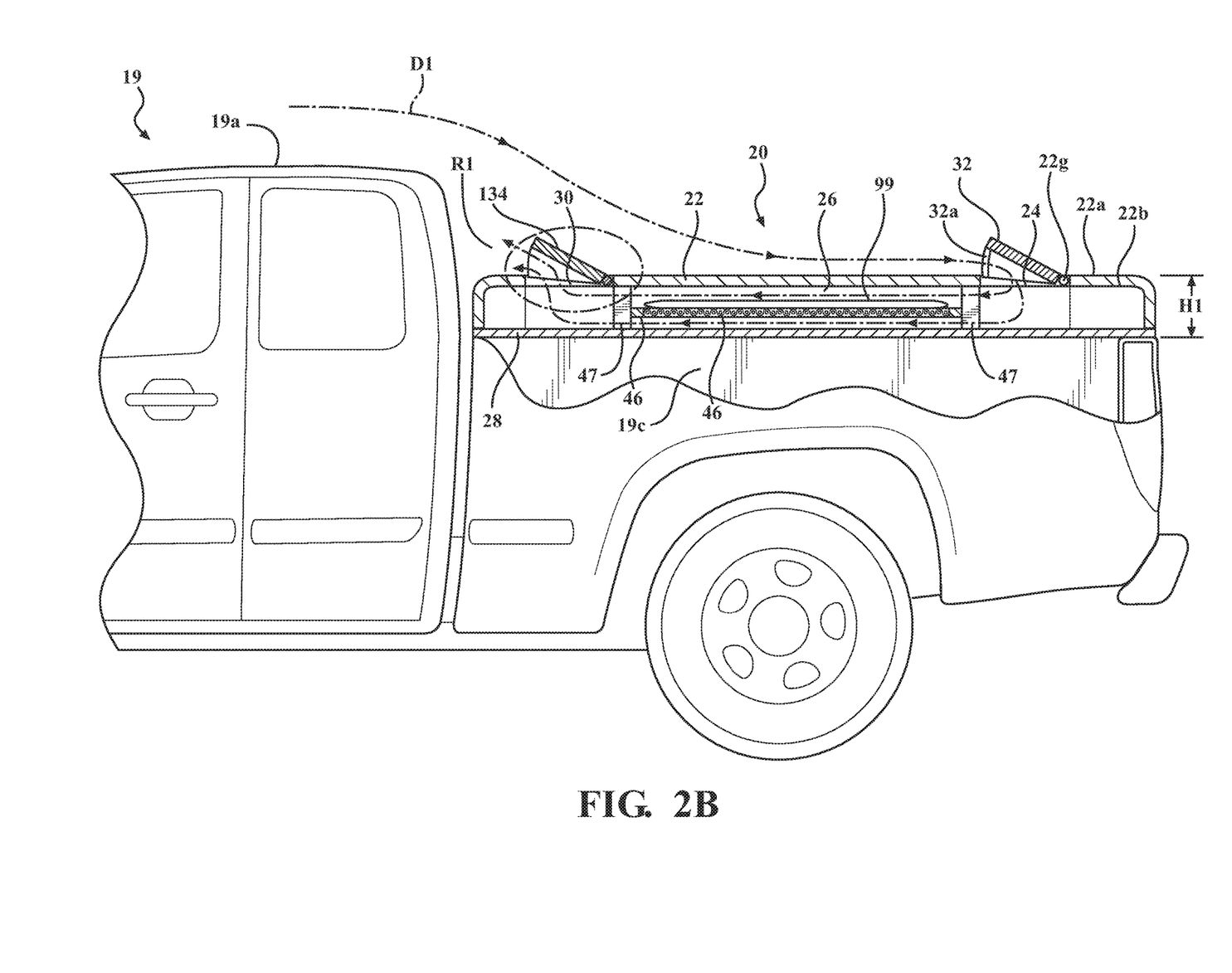
FIG. 2B is a schematic cross-sectional side view of an alternative embodiment of the tonneau cover.

Referring to FIG. 2B, in one or more particular arrangements, an embodiment 134 of the second door may be configured to be operable to direct a flow of air from the second airflow passage 26 in a direction away from the first opening 24 (for example, in a direction toward the cab 19a). This may aid in preventing disruption of the airstream flowing over the tonneau cover toward the first opening 24 by air being discharged from the second opening 30 when there is a high volumetric flowrate of air cycling through the airflow passage 26. While the drawings show embodiments in which the airflow is discharged in forward and rearward directions of the vehicle, air from the airflow passage 26 may alternatively be discharged in any desired direction.

Figure 4:
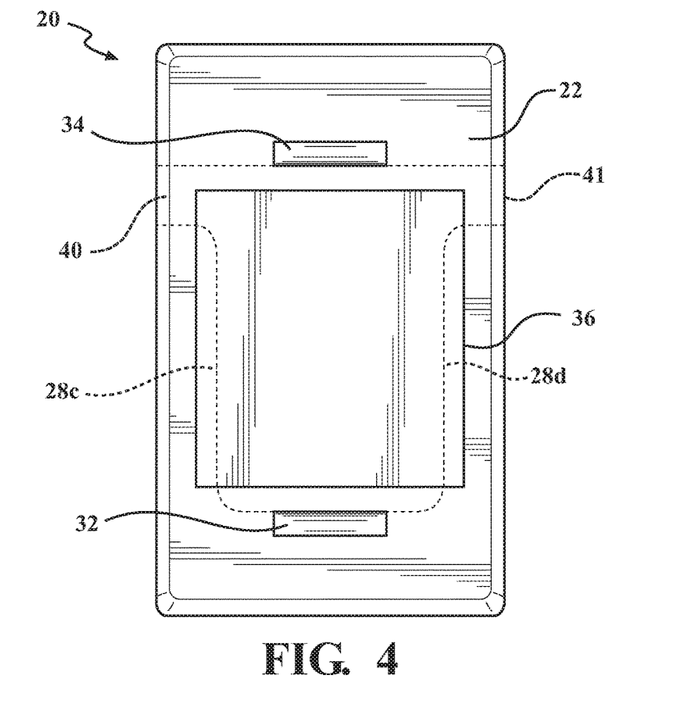
FIG. 4 is a schematic plan view of the tonneau cover shown in FIG. 1.

FIG. 4 is a schematic plan view of the tonneau cover shown in FIG. 1. Referring to FIG. 4, an access door 36 may be attached to the first panel 22 to provide user-access to the airflow passage 26 from an exterior of the tonneau cover. In one or more arrangements, the access door 36 may be rotatably attached to the first panel 22 using a hinge or similar means. A suitable locking or securement mechanism (not shown) may be provided for securing the access door 34 in a closed position and/or in an open position. Although FIG. 4 illustrates one embodiment 36 of an access door, access doors having other shapes and configurations may also be provided at other locations on the tonneau cover 20, depending on the configuration of the airflow passage 26, user preferences, and other pertinent factors.

Referring again to the drawings, the tonneau cover 20 may optionally include at least one other opening extending through an edge of the tonneau cover. The particular embodiment shown includes a pair of openings 40 and 41 extending through opposed side edges or walls 22c, 22d of the first panel 22. Openings 40 and 41 may be structured to enable fluid communication between the airflow passage 26 and an exterior of the airflow passage. The openings 40 and 41 may exhaust to sides of the tonneau cover 20 residing in an airstream flowing along the sides of a moving vehicle. This moving airstream may form relatively lower pressure regions adjacent the side edges of the tonneau cover first panel, thereby facilitating airflow from the airflow passage 26 through openings 40 and 41. Slidable doors (not shown) may be mounted on first panel 22 to enable the openings 40 and 41 to be opened and closed as desired.

Referring again to FIG. 3, at least one object positioning feature 44 may be positioned in the airflow passage 26. The object positioning feature(s) 44 may be designed to help secure an object in a desired location or configuration within the airflow passage. For example, items such as articles of clothing, shoes, etc. may be positioned in the airflow passage 26 for drying by a stream of air moving along the airflow passage 26. The object positioning feature(s) 44 may include clips, stanchions, and/or any of a variety of other mechanisms which may be used to secure (or aid in securing) objects within the airflow passage. For example, clips attached to certain locations within the airflow passage 26 may be used to grasp portions of a clothing item, to spread and maintain the clothing item in a configuration which facilitates drying. Alternatively, the object positioning feature(s) 44 may be detachable from the tonneau cover 20 and individually positionable within the airflow passage 26. For example, individual ones of the object positioning feature(s) 44 may be attachable to any of a variety of locations on the bottom 28b and side walls 28c, 28d of the airflow passage 26, using hook-and-loop fasteners or other types of fasteners.

Figure 5A:
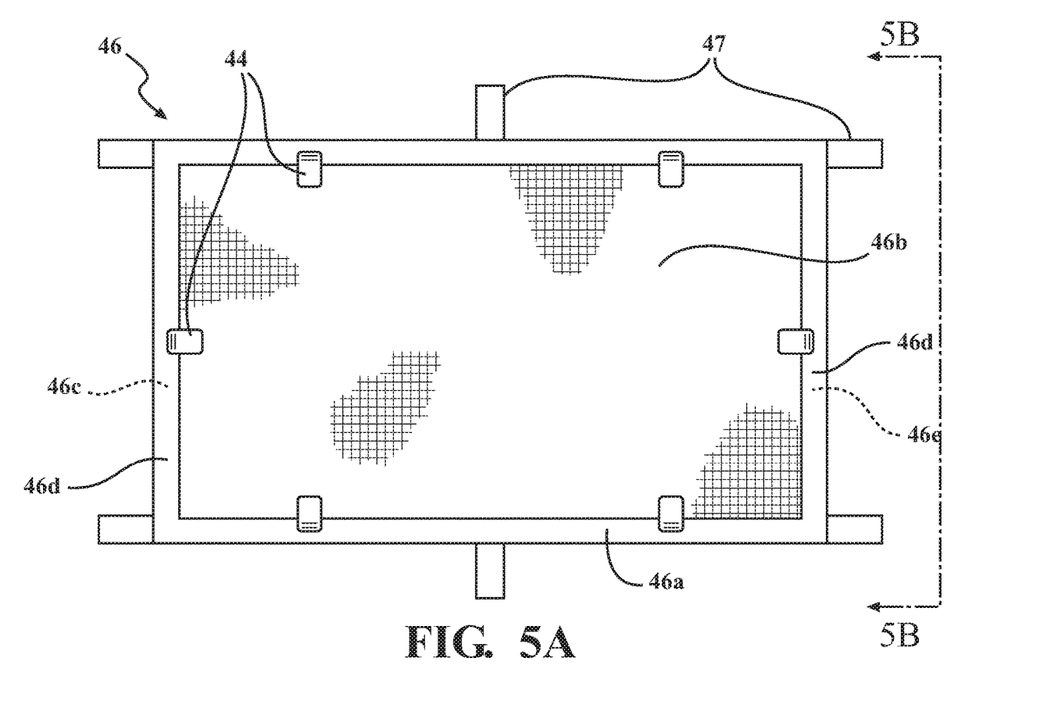
FIG. 5A is a schematic plan view of one embodiment of a rack usable for drying items secured to the rack and positioned in an airflow passage of the tonneau cover.
Figure 5B:
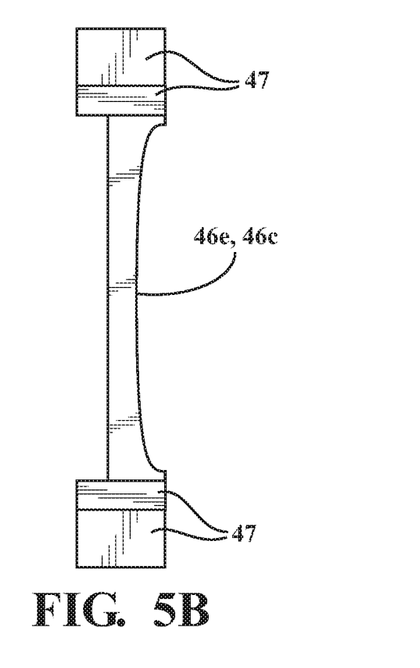
FIG. 5B is a schematic end view of the rack shown in FIG. 5A.
Figure 5C:
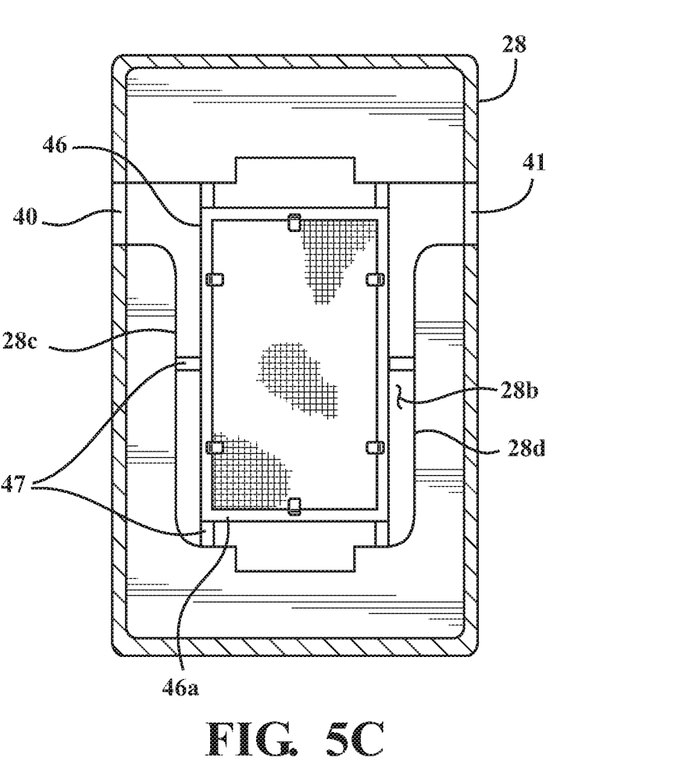
FIG. 5C is a schematic plan view of the rack of FIG. 5A shown positioned within a bottom panel of the tonneau cover.

Referring to FIGS. 5A-5C, in particular embodiments, an object positioning feature in the form of a mounting member 46 may be provided. The mounting member 46 may be a rack or other structure on which an article may be positioned and secured prior to positioning within the airflow passage 26. FIGS. 5A-5C show a mounting member 46 in the form of a rack including a frame 46a supporting a perforated center portion 46b. The center portion 46b may have a porous structure and may be formed from a mesh material or any other material which allows moisture to flow from one side of the center portion through the center portion and onto the tonneau cover second panel 28.

Each end of the frame 46a may have a cavity formed therein to facilitate airflow along opposite sides of the center portion 46b when the rack 46 is positioned in the airflow passage 26. Rack 46 of FIGS. 5A-5C includes a first cavity 46c at a first end 46d and a second cavity 46e at a second end 46f of the frame 46a. As seen in FIGS. 2, 5A, and 5B, cavities 46c, 46e enable air to flow both above and below the rack center portion 46b when the rack 46 rests on the bottom of the 28b of the airflow passage 26. Tabs or spacers 47 may extend from the frame 46a for contacting the airflow passage bottom 28b, side walls 28c, 28d, and first panel second side 22b, to secure the rack 46 in a position within the airflow passage 26 which optimizes airflow around an object to be dried which is secured to the rack 46.

Figure 6:
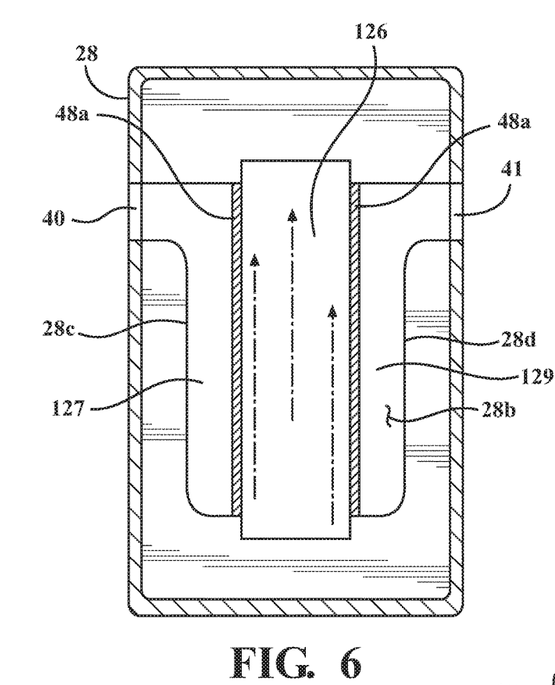
FIG. 6 is a schematic plan view of a bottom panel of the tonneau cover showing one embodiment of wall portions positioned in an airflow passage to channel the airflow.
Figure 7:
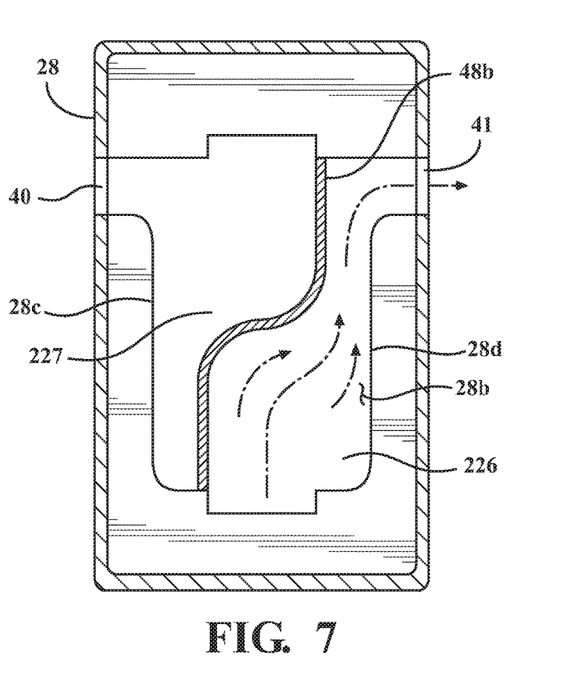
FIG. 7 is a schematic plan view of a bottom panel of the tonneau cover showing another embodiment of wall portions positioned in an airflow passage to channel the airflow.

Referring now to FIGS. 6 and 7, the tonneau cover 20 may further include one or more positionable wall portions (generally designated 48) securable within the airflow passage 26 to partition the airflow passage. Wall portion(s) 48 may be configured to extend from the bottom 28b of the airflow passage 26 to the first panel second side 22b, to block airflow between the first panel second side 22b and the airflow passage bottom 28b where the wall portion(s) 48 are positioned. The wall portions 48 may be shaped to guide airflow entering airflow passage 26 through first opening 24, to one or more desired airflow exit openings such as second opening 30 or one of openings 40 and 41.

The wall portion(s) 48 may be configured to be securable to desired locations within the airflow passage 26 so as to guide the airflow along particular paths and/or toward particular tonneau cover openings. Wall portions 48 may be secured to floor 28b using fasteners or any other suitable method. Use of the wall portion(s) 48 may enable the airflow passage 26 to be partitioned into smaller sub-passages for focused drying of objects, while blocking off other portions of the airflow passage 26 for storage and/or protection of other articles.

Referring to FIG. 6, in one particular example, wall portion(s) 48a may be secured to second panel 28 and configured to extend between first opening 24 and second opening 30 to block off side openings 40 and 41, thereby providing an airflow passage or drying chamber 126 between the openings 24, 30 and wall portions 48a. Other chambers 127 and 129 to either side of the drying chamber 126 may be used to store other articles.

Referring to FIG. 7, in another example, wall portion(s) 48b may be configured to direct airflow from first opening 24 toward a side opening 41 thereby providing an airflow passage or drying chamber 226 between the openings 24, 41 and walls 48b. Another chamber 227 outside the drying chamber 226 may be used to store other articles.

Wall portions 48 may be stored within the airflow passage 26 (for example, along side walls 28c, 28d of the airflow passage 26) when not in use.

Operation of the tonneau cover 20 for drying articles positioned within the airflow passage 26 will now be described. With reference to the drawings, and in particular to FIGS. 1 and 2, the tonneau cover 20 may be mounted on a vehicle 19 such as a pickup truck, as shown in FIG. 2. An object 99 may be positioned on a rack 46 as previously described and secured to the rack. The access door 36 may be opened to provide access to the airflow passage 26. The rack 46 may be positioned in the airflow passage 26 and the access door closed. First and second doors 32, 34 may then be opened to enable airflow into and along the airflow passage 26 when the vehicle is moving. Optionally, one or more side or edge doors controlling airflow through openings 40 and 41 may be opened to enable airflow through openings 40 and/or 41.

Referring to FIGS. 1 and 2, as the vehicle 19 moves, air generally flows over and around the vehicle in a pattern indicated by arrow D1. The airflow may proceed over the vehicle cab 19a, then down onto the tonneau cover 20. A portion of the airflow D1 may impinge upon the open first door 32 and be directed into the first opening 24. Due to the airflow pattern over the vehicle 19, a relatively static, low-pressure region R1 may be formed just behind the cab 19a. The tonneau cover 20 may be configured such that the second opening 30 resides in this low-pressure region R1 when the tonneau cover 20 is mounted on the vehicle 19.

Airflow may proceed along the airflow passage 26 following the path indicated by arrow D1, in a direction extending from a rear end 20b of the tonneau cover toward a front end 20a of the tonneau cover. The air may flow both below and over the object 99 secured to the rack 46 as previously described. The air may then flow out through second opening 30. Positioning of the second opening 30 in a region R1 which is at low pressure during vehicle movement facilitates airflow through the airflow passage 26 and exhaust of the air through second opening 30. The flow of air through the airflow passage 26 is used to dry the object 99.

Referring again to FIG. 3, in another particular embodiment, an optional impeller 51 may be positioned within the airflow passage 26 proximate the first opening 24, in a position suitable for drawing air into the airflow passage 26 through the first opening. Alternatively, the impeller 51 may be positioned within the airflow passage 26 proximate the second opening 30, in a position suitable for drawing air into the airflow passage 26 through the second opening 30. The impeller 51 may be portable and separate from the tonneau cover 20 and may be positionable by a user in the airflow passage 26 as desired. Alternatively, the impeller 51 may be part of the tonneau cover 20 and may be mounted to or otherwise connected to the remainder of the tonneau cover. The impeller 51 may have an independent power source, such as an internal battery (not shown). Alternatively, the impeller 51 may be powerable by a power source mounted in (or connected to) the tonneau cover 20. For example, the tonneau cover 20 may be configured for connection to a vehicle power source (such as the vehicle battery or another power supply) (not shown) which may be usable to power the impeller 51. This arrangement may enable the tonneau cover to be used to dry articles even when the vehicle is not moving.

An embodiment of the tonneau cover 20 may have any height H1 suitable for the purposes described herein.

In another aspect of the embodiments described herein, a tonneau cover 20 is provided for a vehicle 19 having a cab 19a and a cargo bed 19c located behind the cab. The tonneau cover 20 may include an airflow inlet (i.e., first opening 24) located so as to be positioned along a first side 22a of a top panel 22 of the tonneau cover 20 between the cab 19a and a rear end 20b of the tonneau cover when the tonneau cover is mounted on the vehicle 19 so as to cover the cargo bed 19c. An airflow outlet (i.e., second opening 30) may be located so as to be positioned along the first side 22a of the top panel 22 between the cab 19a and the airflow inlet 24 when the tonneau cover 20 is mounted on the vehicle 19 so as to cover the cargo bed 19c. In addition, an airflow passage 26 may extend along a second side 22b of the top panel 22 opposite the first side 22a.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A tonneau cover for a vehicle cargo bed, the tonneau cover comprising a first tonneau cover panel and a second tonneau cover panel positioned opposite the first tonneau cover panel and structured to reside between the first tonneau cover panel and a floor of the cargo bed when the tonneau cover is mounted on the vehicle so as to cover the cargo bed, the first tonneau cover panel including a first opening structured to enable fluid communication between a first side of the first panel and a second side of the first tonneau cover panel opposite the first side, the tonneau cover defining at least one airflow passage in fluid communication with the first opening and extending along the second side of the first tonneau cover panel between the first panel and the second tonneau cover panel.

2. The tonneau cover of claim 1 further comprising a second opening structured to enable fluid communication between the first side of first tonneau cover panel and the at least one airflow passage along the second side of first tonneau cover panel and wherein the at least one airflow passage extends between the first opening and the second opening.

3. The tonneau cover of claim 2 further comprising an impeller configured to be positionable within the at least one airflow passage and operable to draw air into the at least one airflow passage through one of the first opening and the second opening.

4. The tonneau cover of claim 2 further comprising a first door operable to direct a flow of air from the first side of the first tonneau cover panel into the first opening when the tonneau cover is mounted on a vehicle and the vehicle is moving in a forward direction of the vehicle, the first door also being operable to block a flow of air through the first opening between the first side of the first tonneau cover panel and the at least one airflow passage.

5. The tonneau cover of claim 4 further comprising a second door operable to permit a flow of air through the second opening between the at least one airflow passage and the first side of the first tonneau cover panel and operable to block a flow of air through the second opening between the at least one airflow passage and the first side of the first tonneau cover panel, and wherein the second door is configured to be operable to direct a flow of air from the at least one airflow passage in a direction toward the first opening.

6. The tonneau cover of claim 1 wherein the second tonneau cover panel is structured to prevent leakage of moisture from the at least one airflow passage through the second tonneau cover panel.

7. The tonneau cover of claim 1 further comprising at least one other opening extending through an associated side edge of the tonneau cover and structured to enable fluid communication between the at least one airflow passage and an exterior of the at least one airflow passage.

8. The tonneau cover of claim 1 further comprising at least one object positioning feature positioned in the at least one airflow passage.

9. The tonneau cover of claim 8 wherein the at least one object positioning feature is positioned on at least one of the first tonneau cover panel and the second tonneau cover panel.

10. The tonneau cover of claim 8 further comprising at least one mounting member positioned in the at least one airflow passage, and wherein the at least one object positioning feature is located on the at least one mounting member.

11. The tonneau cover of claim 1 further comprising one or more positionable wall portions securable within the airflow passage to guide an air flow within the airflow passage.

12. The tonneau cover of claim 1 further comprising at least one access door formed in the first tonneau cover panel and operable to enable access to the at least one airflow passage from an exterior of the tonneau cover.

13. A tonneau cover for a vehicle having a cab and a cargo bed located behind the cab, the tonneau cover comprising:
an airflow inlet located so as to be positioned along a first side of a top panel of the tonneau cover between the cab and a rear end of the tonneau cover when the tonneau cover is mounted on the vehicle so as to cover the cargo bed;
an airflow outlet located so as to be positioned along the first side of the top panel between the cab and the airflow inlet when the tonneau cover is mounted on the vehicle so as to cover the cargo bed; and
an airflow passage extending along a second side of the cover top panel opposite the first side,
the tonneau cover being structured to direct a flow of air along the airflow passage from the inlet toward the outlet when the vehicle is moving in a forward direction of the vehicle.

14. The tonneau cover of claim 2 wherein the second opening is structured to reside between the first opening and a cab of the vehicle when the tonneau cover is mounted on the vehicle.

15. The tonneau cover of claim 7 comprising a side opening extending through each side edge of a pair of opposed side edges of the tonneau cover, each side opening being structured to enable fluid communication between the at least one airflow passage and the exterior of the at least one airflow passage.

16. The tonneau cover of claim 4 wherein the at least one airflow passage is structured to direct a flow of air from the first opening toward the second opening when the tonneau cover is mounted on a vehicle and the vehicle is moving in a forward direction of the vehicle.

* * * * *